United States Patent [19]

Ostrop

[11] 3,968,040
[45] July 6, 1976

[54] PLATE FILTER WITH HORIZONTALLY ARRANGED BILATERALLY ACTING FILTERS

[75] Inventor: Ernst Ostrop, Stockheim, Germany

[73] Assignee: Eberhard Hoesch & Söhne, Duren, Germany

[22] Filed: May 6, 1975

[21] Appl. No.: 574,909

[30] Foreign Application Priority Data
May 6, 1974 Germany............................ 2421781

[52] U.S. Cl................................. 210/225; 210/400
[51] Int. Cl.²........................................ B01D 25/12
[58] Field of Search.................... 100/198, 200, 202; 210/224, 225, 226, 227, 228, 229, 230, 386, 387, 400

[56] References Cited
UNITED STATES PATENTS

| | | | |
|---|---|---|---|
| 569,920 | 10/1896 | Hubbell | 100/200 |
| 3,342,123 | 9/1967 | Ermakov et al. | 210/225 X |
| 3,583,566 | 6/1971 | Meshengisser et al. | 210/230 X |
| 3,655,056 | 4/1972 | Schotten et al. | 210/227 |
| 3,760,945 | 9/1973 | Davis | 210/225 X |

Primary Examiner—Charles N. Hart
Assistant Examiner—Robert H. Spitzer
Attorney, Agent, or Firm—Spencer & Kaye

[57] ABSTRACT

A plate filter composed of horizontal filter plates arranged in a vertical stack and each defining a fluid-tight partition and being provided with fluid flow channels at both its upper and lower faces, a plurality of frame members each disposed between a respective adjacent pair of filter plates, a pressing unit arranged to press the filter plates and frame members toward one another in a direction to close the filter, cloth guided by rollers to traverse a path extending past each face of each filter plate in the region between each such face and the frame member adjacent thereto, and a suspension arrangement composed of a chain of links supporting the filter plates and the frame members when the filter is open.

11 Claims, 2 Drawing Figures

PLATE FILTER WITH HORIZONTALLY ARRANGED BILATERALLY ACTING FILTERS

BACKGROUND OF THE INVENTION

The present invention relates to a plate filter having horizontally arranged filter plates for extracting liquid from a slurry while forming the solid constituents into a filter cake.

In a filter of this type, the filter plates can be pressed toward one another by a locking device and an endless filter band passes between the plates and is guided on rollers, each filter plate being provided with a watertight partition which is provided with channels for guiding the liquid and has a frame-type raised portion along its edges which extends toward both sides of the plate and serves as a sealing surface.

German Pat. No. 1,461,500 discloses a plate filter of the above-mentioned type. In this plate filter, the filter chamber is formed by two adjacent filter plates, the frame-type raised portion being larger toward one side of the partition than toward the other so that every filter plate has the shape of a flat, downwardly open bowl.

It has now been found that for a number of particular fields of use, particularly in cases where the resulting filter cake must be rinsed before the filtering process is completed, the consumption of rinse water can be reduced only by increasing the cake thickness. However, the necessary corresponding increase in the depth of the chamber in the known press is possible only within limits since the drop in efficiency of a plate filter is more than proportional to the increase in the chamber depth.

SUMMARY OF THE INVENTION

It is therefore an object of the present invention to modify such a known plate filter so that larger cake thicknesses can be handled without decreasing the filter efficiency.

This and other objects according to the present invention are achieved by providing the filter plates with channels on both sides of the plates, disposing a frame between each two adjacent filter plates and arranging the filter cloth to pass directly by the upper and underside of a filter plate and between a filter plate and an associated frame. With this arrangement, a filter chamber is produced between two filter plates from which the fluid i.e. the filtrate can be pushed through filter cloth at both sides, meanwhile the solids of the slurry remain and accumulate to a cake in the filter chamber. The placing of a frame between two adjacent filter plates further offers the possibility of optimally setting the depth of the filter chambers in an available filter press, depending on the product to be filtered, by the use of frames of different heights.

In embodiments of the present invention, a suspension device is provided to connect the filter plates and the frames to one another, the members of the suspension device being dimensioned so that when the plate filters are open, the distance between the underside of a filter plate and the frame therebelow is less than the distance between the upper side of a filter plate and the frame thereabove. This arrangement assures that the cake formed during the filtering and pressing operation can be safely removed without the opening or closing path for the entire filter arrangement becoming inappropriately large.

According to a further embodiment of the present invention, an additional advantage is provided by having the distance between the upper side of the filter plate and the frame thereabove correspond at least to the height of the frame. Since the space between the underside of the filter plate and the frame therebelow need only be large enough so that the filter cloth, when the press is open, can be pulled through without affecting the filter cloth drive, this will produce an advantageous limitation in the structural size of the filter press.

In an advantageous embodiment of the invention, the opening of each frame is designed to widen in the direction toward the filter plate disposed therebelow. Thus, when the plate filter is opened, the upper filter plate can safely be lifted together with the frame away from the filter cake therebelow.

In a further advantageous embodiment of the invention, the frame is provided with at least one slurry inlet opening. By placing the slurry inlet for the respective filter chamber in the associated frame, there results a particularly favorable inflow of slurry, as well as a substantial structural simplification of the associated filter plates, because the latter need only be provided with inlet and outlet channels for the rinse water, the filtrate and possibly air. Furthermore, it is possible with relatively simple structures to increase the number of inlet openings without having to change the associated filter plates.

According to a further embodiment of the invention, the filter plates are each in communication with inlet lines for the rinsing liquid and for the blowing-in of air through the space formed by the channels in the underside of the plates. With this arrangement it is advantageously possible, once the filtrate has been removed from both sides of the respective filter chamber, to introduce the rinse water and possibly air for blowing dry the filter cake from but one side so that the filter cake can be rinsed out in a particularly effective manner.

According to a further embodiment of the invention, link chains are provided as the suspension device and each link is provided with a bore at one end and a longitudinal hole at the other end, the chain also being composed of connecting bolts formed by supporting journals which are connected with the filter plates. Each link is additionally provided with a recess for accommodating a holding pin connected with a frame. With this particularly advantageous configuration of the plate filter according to the invention, the locking and opening process can be effected in a simple manner in spite of the greater number of elements resulting from the additionally provided frames, and the greater weight. It is particularly advantageous that the same distance can be set for all elements during opening and that, from the standpoint of stability, the individual filter plates need be designed only on the basis of their own weight while the weight of the filter plates is fully supported by the link chains and from there by the machine frame.

In accordance with a further feature of the invention, the recess for the holding pin of each frame is disposed below the bore in the associated link and its dimensions are greater than the diameter of the holding pin. This permits easy removal of the filter plate from the frame therebelow so that the filter cloth can be freely pulled through when the press is open.

According to a particularly advantageous feature, each frame is suspended via separate supporting slips from the supporting journals of the filter plate disposed thereabove, longitudinal holes being provided for the holding pins of the frame and the openings of these holes being adapted to the distance between the filter plate underside and the frame. This arrangement has the advantage that, during the closing and opening process, the frame can place itself against the sealing surfaces of the two adjacent filter surfaces since it is held by the filter plate thereabove in a manner independent of the links of the suspending device without any adverse influences from the links of the suspending device during the closing process.

DESCRIPTION OF THE PREFERRED EMBODIMENTS

Figure 1:
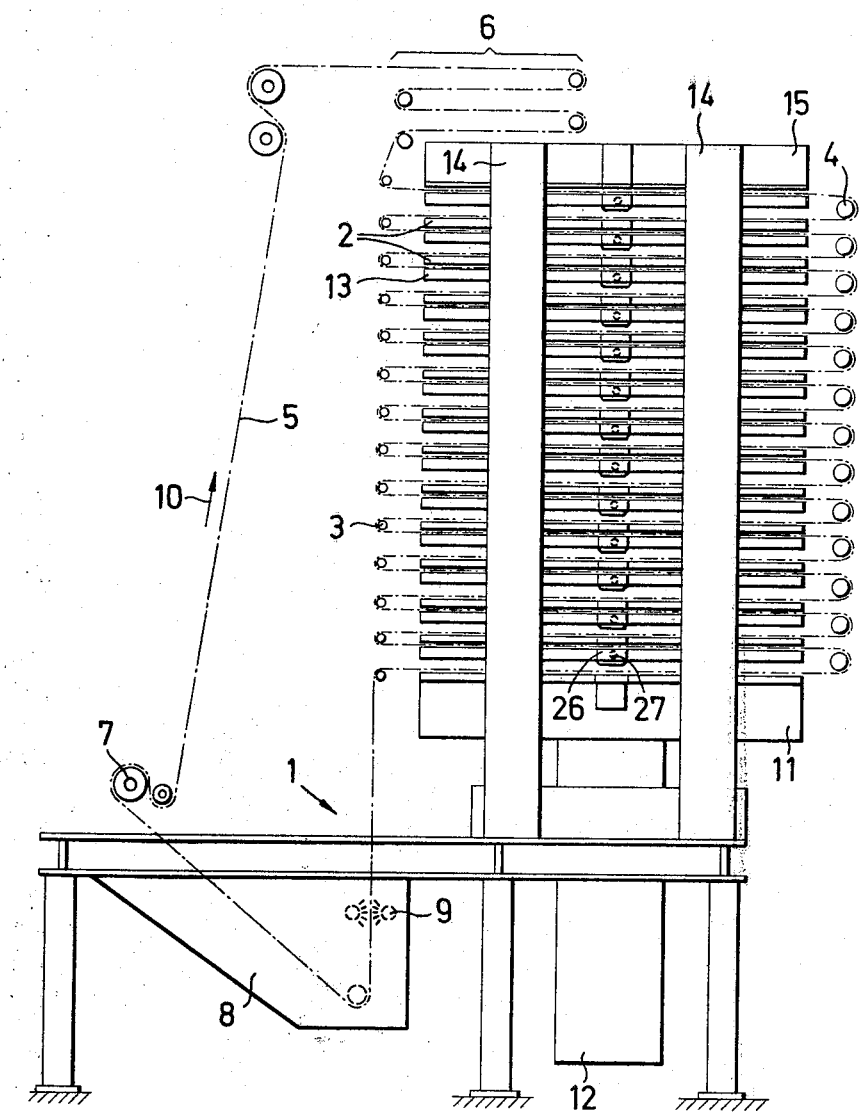
FIG. 1 is a side view of an embodiment of a plate filter according to the invention.

The filter press apparatus shown in FIG. 1 is composed of a machine frame 1 which accommodates a plurality of superposed filter plates 2. A plurality of guide rollers 3 extends along one side of the filter plate array, while a similar plurality of guide rollers 4 extends along the opposite side thereof. A respective roller 3 is located adjacent one edge of each plate 2 and a respective roller 4 is located adjacent the opposite edge of each plate 2. An endless filter cloth 5 is brought around rollers 3 and 4, passing alternatingly around a roller 3 and a roller 4, so that a respective reach of cloth 5 passes adjacent each face of each plate 2.

At the upper end of the filter arrangement, the filter cloth passes through a schematically indicated tensioning station 6, and in the lower region the cloth passes through a drive station 7. Below the drive station there is disposed a rinsing device 8 provided with nozzles 9 from which the filter cloth can be charged with rinsing water. The movement of the filter cloth takes place in the direction of arrow 10.

The lowermost filter plate is disposed on a lifting table 11 which is connected with a locking device 12 in the form of a hydraulic cylinder, for example.

Between every two adjacent filter plates 2 there is provided a frame 13. When the plate filter is closed, each frame 13 forms a filter chamber in cooperation with the filter plate disposed thereabove and the filter plate disposed therebelow. The individual filter plates and the frames disposed therebetween are suspended from a yoke plate 15 which is supported by vertical supports 14. The filter plates and frames are suspended from plate 15 by a suspension device shown in detail in FIG. 2 but hidden in FIG. 1 by the two supports 14.

The filter plates 2 are provided, according to the present invention, with channels at both sides thereof. Accordingly, the filter cloth is guided so that it passes directly by both sides of each filter plate, a fact which must be taken into account in the design and arrangement of guide rollers 3 and 4.

Figure 2:
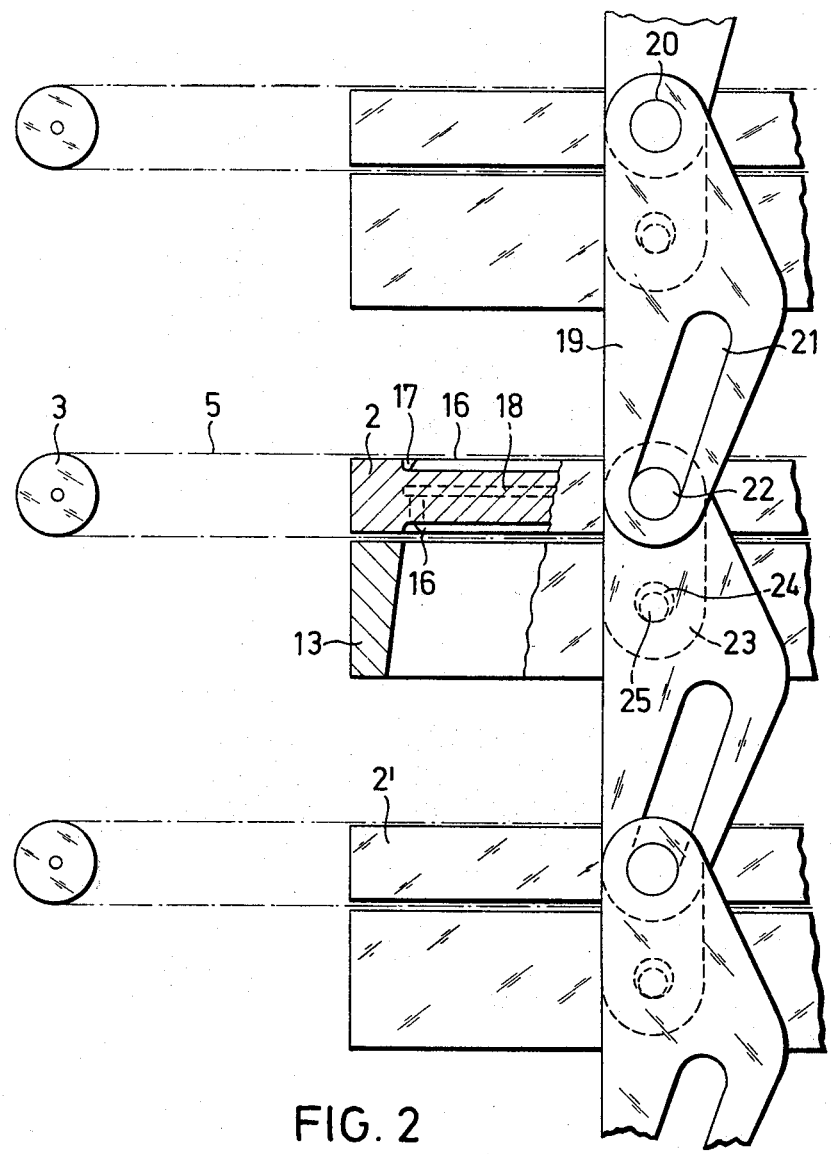
FIG. 2 is a side view, to an enlarged scale and partly in cross section, of the suspension device, with filter plates and frames, of the embodiment of FIG. 1.

FIG. 2 shows details of the filter plate, the frame and the suspension device of the apparatus of FIG. 1. As appears at the portion in cross section of the middle plate-frame arrangement, the filter plates 2 according to the invention are provided with channels 16 at both faces. These channels in each surface of a plate are composed of a plurality of parallel arranged grooves which extend parallel to the plane of the drawing and which open at their ends into a collecting trough 17 extending transversely to the direction of the grooves. The filter plates are connected with inlet lines for rinse water and air (not shown in detail) and with extraction devices for the resulting filtrate coming from the area formed by the channels. As shown by the channel 18 (in dashed lines) which opens into the area of the lower channels of plate 2, rinse water and blown-in air are forced into the filter chamber therebelow and then extracted from filter plate 2' by means of filtrate extraction devices.

As further shown in the cross-sectional portion, frames 13 are designed so that their opening widens toward the bottom, thus assuring dependable removal of the filter cake. The degree of widening must be adapted to the particular product to be filtered. In the case of sticky products the opening angle must be greater than that shown in the drawing.

FIG. 2 depicts the filter in its open state in order to more clearly show the suspension device. This device includes for example, a total of four link chains, two at the front of the apparatus and two at the rear. FIG. 2 shows part of one such chain, the links 19 of which are each provided with a bore 20 at one end and an elongated slot 21 at the other end. The bore 20 at the top is connected with the slot 21 of the link thereabove by a journal pin 22 which is fastened to the associated filter plate 2. In the open state of the filter, every filter plate is thus suspended from the link chain without the weight of a filter plate being imposed on the filter plates thereabove. The total weight of the filter plates is supported by the four link chains and the yoke plate.

When the plate filter is closed, the plates and frames lay themselves one on top of the other, beginning at the bottom of the filter, and the journal pins 22 move upwardly in the slots 21 so that the respective links 19 are pivoted to a certain extent. The links shown in FIG. 2 would, for example, be pivoted clockwise about pins 22.

In order to eliminate any influence of the pivoting of the links during closing of the plate filter on the fastening of the frames to the suspension device, additional suspension clips 23 are provided. One end of each clip 23 is held by a supporting journal pin 22 and the other end thereof is provided with a bore or an elongated opening 24 into which a holding pin 25 of the respective frame 13 engages. Thus the frame can safely rest on the filter plate therebelow during the closing process independent of the suspension device.

The introduction of the substance to be filtered and the removal of filtrate is effected in the conventional manner through inlet and outlet channels which are formed in the filter plates and frames by suitable flush bores as indicated in FIG. 1 by conduits 26 for the slurry inlet. Corresponding channels (not shown) are provided for the discharge of filtrate and/or rinse water. A particular advantage of the present invention is that separate discharge channels are provided for the filter surfaces disposed above a frame and for those disposed below a frame. If these channels are made blockable, it is possible to initially remove the clear filtrate through both channels and then the rinse filtrate only through the channel associated with the filter surface disposed below a frame, the other channel being blocked.

The flush bores form a continuous channel in the closed state of the filter press and connecting channels branch off therefrom, these connecting channels including filtrate discharge channels leading to the filter plates or slurry inlet channels leading to the individual frames. Whereas in the prior art plate filters, the inlet and outlet channels for the slurry and the filtrate exclusively enter into the filter plates, the present invention provides the advantage that the slurry can enter through simple bores 27 in the frames into the filter chambers which are each formed by two filter plates and an interposed frame.

The conduit 26 is formed by a lateral projection at the outer side of each filter plate 2 and frame 13 respectively. A downward projecting conical elongation of each of the holes forming the conduit, inserting into a corresponding recess of the next hole below when closing the plate filter ensures that liquid cannot escape from the conduit when the plate filter opens.

At least two conduits are arranged in this manner at opposite sides of the plate filter, whereby one conduit serves as inlet-and distribution conduit for the slurry (as shown in FIG. 1) and the other conduit (not shown) serves as collecting-and outlet conduit for the filtrate, rinsing fluid etc. and in the same way by simple bores (not shown) in each filter plate with trough 17.

Rinsing fluid and air are supplied in a known manner to each filter plate by individual, partly flexible tubes (not shown in FIG. 1). The blocking of the channels, conduits or tubes resp. is effected by valves in a known manner.

If the arrangement of guide rollers 3, 4 shown in FIG. 1 is reversed, i.e. rollers 4 with the larger diameter are disposed above the rinsing device, this provides the additional possibility of using larger filter plates and thus of increasing the filter surface.

It will be understood that the above description of the present invention is susceptible to various modifications, changes and modifications, and the same are intended to be comprehended within the meaning and range of equivalents of the appended claims.

What is claimed is:

1. In a plate filter apparatus composed of a plurality of horizontally disposed filter plates arranged in a vertical stack and each presenting an upper face and a lower face, a locking assembly associated with the plates and operable to press the plates toward one another to close the filter and to move the plates away from one another to open the filter, an endless filter cloth band, and a plurality of guide rollers around which the band passes, the rollers being arranged in a manner such that the band passes between adjacent filter plates, each filter plate defining a liquid tight partition located between its faces and provided with channels for the discharge of liquids, and each plate being provided with rim portions projecting vertically at both plate faces to define sealing surfaces, the improvement wherein: each said filter plate is provided at each of its said faces with fluid flow channels communicating with said channels for the discharge of liquids; said apparatus comprises a plurality of frame members each disposed between a respective pair of adjacent filter plates and each constituted by a rim surrounding a hollow region and formed to coincide with the rim portions of said plates which are directed toward said frame member, the rim of each said frame member and said pair of filter plates adjacent thereto defining a filter chamber when said plates are pressed toward one another; and said filter cloth band extends along a path which passes between each filter plate face and the respective adjacent frame member.

2. An arrangement as defined in claim 1 further comprising suspension means supporting said plates and said frame members when said plates are moved away from one another, said suspension means including a plurality of links connecting said plates and said frame members to one another, said links being dimensioned so that when the plate filter is open the distance between said lower face of one said filter plate and said frame member disposed immediately therebelow is less than the distance between said upper face of said one filter plate and said frame member disposed immediately thereabove.

3. An arrangement as defined in claim 2 wherein, when said filter is open, the distance between the upper face of said one filter plate and said frame member disposed immediately thereabove corresponds to at least the height of said frame member.

4. An arrangement as defined in claim 3 wherein said links form at least one chain, each said link is provided with a bore in one end thereof, an elongated slot in the other end thereof and a recess, and said suspension means further comprise a plurality of journal pins each connected to a respective filter plate and each connecting a pair of adjacent links together, and a plurality of holding pins each connected to a respective frame member and engaging in said recess in a respective link.

5. An arrangement as defined in claim 4 wherein, in each said link, said recess is disposed below said bore and presents an opening which is larger than the diameter of the associated holding pin.

6. An arrangement as defined in claim 4 wherein: each said link includes a main link member provided with said bore and said elongated slot, and a suspension clip member provided with said recess, each said suspension clip member being further provided with a bore; each said journal pin engages a respective link via said bore in its main link member and said bore in its suspension clip member, and engages the next higher link via its said elongated slot, and said recess in each said suspension clip is dimensioned in accordance with the distance between each said filter plate and the frame member immediately therebelow when said filter is open.

7. An arrangement as defined in claim 1 wherein said rim of each said frame member is formed to cause the hollow region surrounded by said rim to become wider in the direction toward the filter plate disposed therebelow.

8. An arrangement as defined in claim 1 wherein said frame member is provided with at least one slurry inlet opening formed in its said rim.

9. An arrangement as defined in claim 1 wherein each said filter plate is provided with passages for placing the channels at its said lower face in communication with inlet lines for a source of rinse liquid and/or air.

10. An arrangement as defined in claim 1 wherein the lower face of a said filter plate and the upper face of the filter plate immediately therebelow define the upper and lower boundaries of a respective filter chamber, said channels at said faces being in communication with said chamber and one of said channels constituting a filtrate discharge channel.

11. An arrangement as defined in claim 1 further comprising means for blocking at least one of the channels in communication with a said filter chamber.

* * * * *